(12) United States Patent
Blake et al.

(10) Patent No.: US 7,694,339 B2
(45) Date of Patent: *Apr. 6, 2010

(54) METHOD AND SYSTEM FOR MORPHING HONEYPOT WITH COMPUTER SECURITY INCIDENT CORRELATION

(75) Inventors: Kenneth W. Blake, Austin, TX (US);
Vikki Kim Converse, Austin, TX (US);
Ronald O'Neal Edmark, Smyrna, TN (US); John Michael Garrison, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 31 days.

This patent is subject to a terminal disclaimer.

(21) Appl. No.: 12/164,020

(22) Filed: Jun. 28, 2008

(65) Prior Publication Data

US 2008/0271151 A1    Oct. 30, 2008

Related U.S. Application Data

(63) Continuation of application No. 10/334,421, filed on Dec. 31, 2002, now Pat. No. 7,412,723.

(51) Int. Cl.
*G06F 11/00* (2006.01)
*G06F 12/14* (2006.01)
*G06F 15/177* (2006.01)

(52) U.S. Cl. .................. 726/23; 726/22; 726/24; 726/25; 709/220; 709/224; 709/249

(58) Field of Classification Search ............. 726/22–25; 709/220, 224, 249
See application file for complete search history.

(56) References Cited

U.S. PATENT DOCUMENTS

| | | | | |
|---|---|---|---|---|
| 5,440,723 A | * | 8/1995 | Arnold et al. | 714/2 |
| 6,907,533 B2 | * | 6/2005 | Sorkin et al. | 726/22 |
| 6,981,155 B1 | * | 12/2005 | Lyle et al. | 726/22 |
| 7,383,578 B2 | * | 6/2008 | Blake et al. | 726/23 |
| 7,412,723 B2 | * | 8/2008 | Blake et al. | 726/23 |
| 2002/0138755 A1 | * | 9/2002 | Ko | 713/201 |
| 2003/0233438 A1 | * | 12/2003 | Hutchinson et al. | 709/223 |

* cited by examiner

*Primary Examiner*—William R Korzuch
*Assistant Examiner*—Trang Doan
(74) *Attorney, Agent, or Firm*—Jeffrey S. LaBaw; David H. Judson

(57) ABSTRACT

A method, system, apparatus, or computer program product is presented for morphing a honeypot system on a dynamic and configurable basis. The morphing honeypot emulates a variety of services while falsely presenting information about potential vulnerabilities within the system that supports the honeypot. The morphing honeypot has the ability to dynamically change its personality or displayed characteristics using a variety of algorithms and a database of known operating system and service vulnerabilities. The morphing honeypot's personality can be changed on a timed or scheduled basis, on the basis of activity that is generated by the presented honeypot personality, or on some other basis. The morphing honeypot can also be integrated with intrusion detection systems and other types of computer security incident recognition systems to correlate its personality with detected nefarious activities.

22 Claims, 6 Drawing Sheets

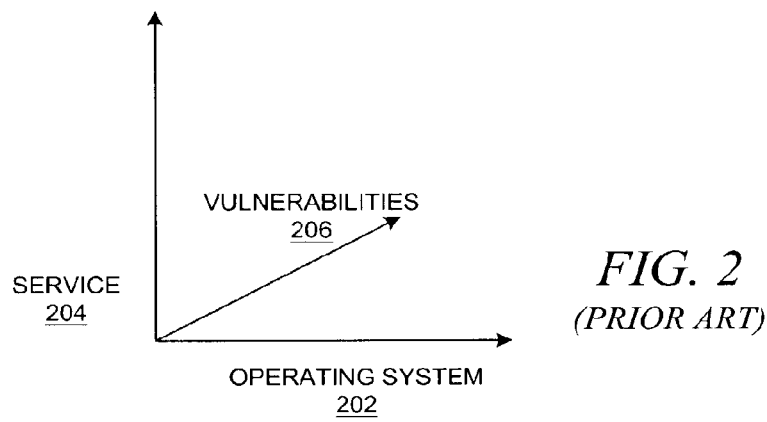
*FIG. 2*
*(PRIOR ART)*
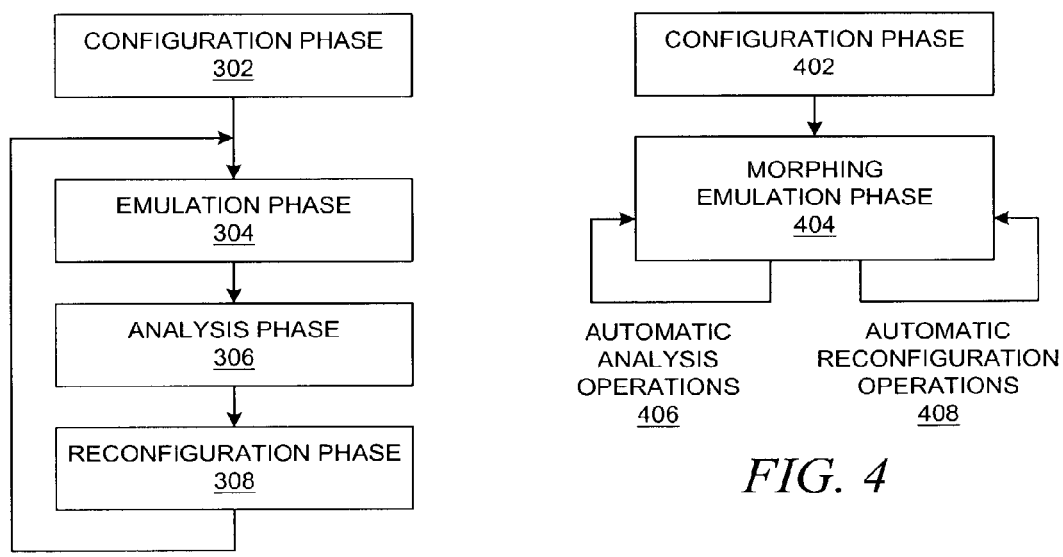
*FIG. 3*
*(PRIOR ART)*
*FIG. 4*

METHOD AND SYSTEM FOR MORPHING HONEYPOT WITH COMPUTER SECURITY INCIDENT CORRELATION

This application is a continuation of Ser. No. 10/334,421, filed Dec. 31, 2002 now U.S. Pat. No. 7,412,723.

CROSS-REFERENCE TO RELATED APPLICATIONS

The present application is related to the following application with a common assignee:

U.S. Ser. No. 12/108,236, filed Apr. 23, 2008, titled "Method and System for Morphing Honeypot".

BACKGROUND OF THE INVENTION

1. Field of the Invention

The present invention relates to an improved data processing system and, in particular, to a method and apparatus for computer security.

2. Description of Related Art

The connectivity of the Internet provides malicious users with the ability to probe data processing systems and to launch attacks against computer networks around the world. While computer security tools provide defensive mechanisms for limiting the ability of malicious users to cause harm to a computer system, computer administrators are legally limited in their ability to employ offensive mechanisms. Although an intrusion detection system can alert an administrator to suspicious activity so that the administrator can take actions to track the suspicious activity and to modify systems and networks to prevent security breaches, these systems can typically only gather information about possible security incidents.

Honeypots have been developed as a tool to help computer security analysts and administrators in coping to a small degree with malicious computer activity. A honeypot has been defined as a resource that has value in being probed, attacked, or compromised. A resource may be an application, an object, a document, a page, a file, other data, executable code, other computational resource, or some other type of communication-type resource. For example, a honeypot may comprise a network of servers; a honeypot server is sometimes called a decoy server.

A typical honeypot is a computer server that has limited or no production value; in other words, a typical honeypot performs no significant work within an enterprise other than monitoring for activity. Since the honeypot has no significant production value, its significant value lies in the fact that it acts as a decoy to lure malicious users or hackers to probing or attacking it. In the meantime, it is hoped that a malicious user would ignore production systems that have true value within an enterprise. In addition, the honeypot collects information about probes or attacks. From this perspective, a honeypot provides a tool with a small offensive capability. Ideally, the honeypot maintains a malicious user's interest so that significant information can be gathered about the methods of operation of the malicious user and whether any computer security flaws are discovered that require immediate administrative attention.

Preventive measures are usually taken so that a malicious user does not discover the true nature of the honeypot; otherwise, the malicious user would ignore the honeypot and begin probing other systems. For example, steps are usually taken to hide any administrative information within a computer network about the existence of a honeypot so that a malicious user does not capture and read about the configuration of a honeypot, e.g., activity logs or special file names. Hence, it is common practice to configure honeypots as relatively simple systems with little activity so that sophisticated, malicious users do not detect any activity that might lead this type of user to suspect that a system that is being probed is a honeypot. For this reason, honeypots are typically taken offline to be administratively analyzed and manually reconfigured. While providing some utility, a typical honeypot remains a passive tool with limited utility.

Therefore, it would be advantageous to employ a honeypot in a more offensive role for assisting a system administrator in detecting malicious activity. It would be particularly advantageous to correlate the use of a honeypot with the use of computer security incident recognition systems and applications.

SUMMARY OF THE INVENTION

A method, system, apparatus, or computer program product is presented for morphing a honeypot system on a dynamic and configurable basis. The morphing honeypot emulates a variety of services while falsely presenting information about potential vulnerabilities within the system that supports the honeypot. The morphing honeypot has the ability to dynamically change its personality or displayed characteristics using a variety of algorithms and a database of known operating system and service vulnerabilities. The morphing honeypot's personality can be changed on a timed or scheduled basis, on the basis of activity that is generated by the presented honeypot personality, or on some other basis. The morphing honeypot can also be integrated with intrusion detection systems and other types of computer security incident recognition systems to correlate its personality with detected nefarious activities.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

FIG. 2 depicts a set of dimensions for a database of known vulnerabilities;

FIG. 3 depicts a diagram of a set of modes of operation for a typical honeypot;

FIG. 4 depicts a diagram of a set of modes of operation for the morphing honeypot of the present invention;

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
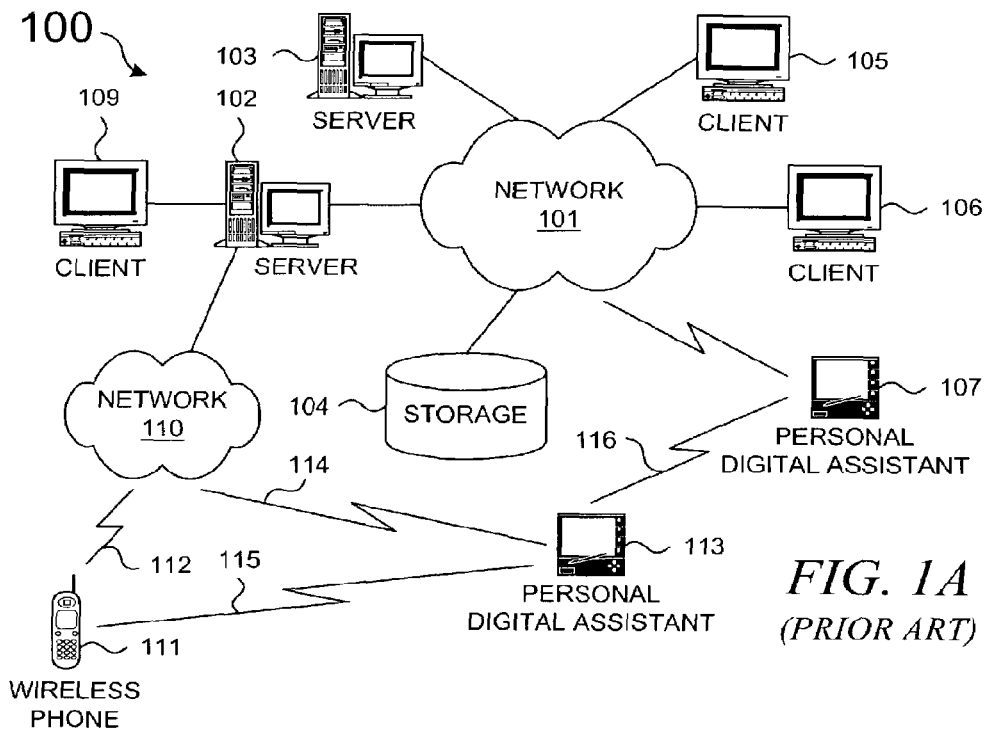
FIG. 1A depicts a typical distributed data processing system in which the present invention may be implemented.

With reference now to the figures, FIG. 1A depicts a typical network of data processing systems, each of which may implement a portion of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), File Transfer Protocol (FTP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

The present invention could be implemented on a variety of hardware platforms; FIG. 1A is intended as an example of a heterogeneous computing environment and not as an architectural limitation for the present invention.

Figure 1B:
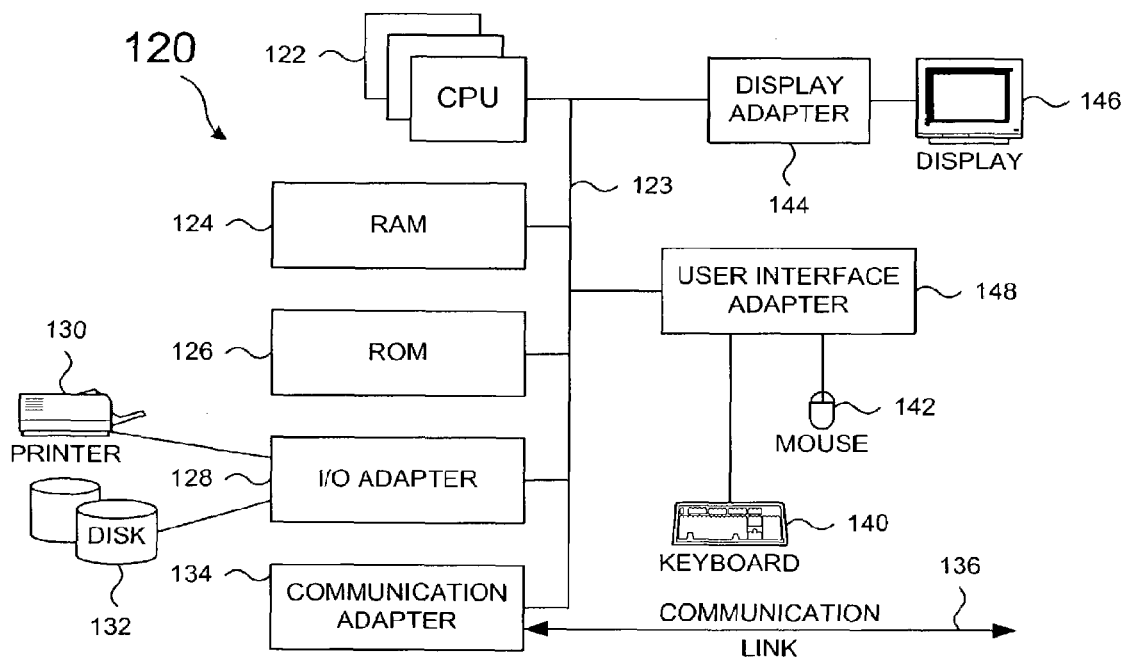
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as a audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The present invention may be implemented on a variety of hardware and software platforms, as described above with respect to FIG. 1A and FIG. 1B. More specifically, though, the present invention is directed to operating a morphing honeypot, as described in more detail below with respect to the remaining figures.

With reference now to FIG. 2, a diagram depicts a set of dimensions for a typical database of known vulnerabilities. As is well-known, a database of known vulnerabilities can be compiled through empirical observation. Information about multiple operating systems 202 can be stored in the vulnerability database along with a set of associated services 204 that execute with support from an operating system. A particular type of service, such as an FTP server, is implemented under different operating systems using different code libraries, and each implementation of a particular type of service has its own set of known vulnerabilities 206. A vulnerability in a service is typically discovered by accident, by trial and error via a legitimate testing procedure, or by trial and error via malicious attempts to break the service. Information about these vulnerabilities are stored, compiled, and shared amongst various groups of users or organizations; persons who attempt to secure systems against vulnerabilities are often termed "whitehats", while persons who attempt to harm systems by exploiting vulnerabilities are often termed "blackhats".

For example, a vulnerability might be discovered, either accidentally or maliciously, when an invalid value for a particular parameter (or a set of values for multiple parameters in which the combination of values is somehow invalid) is sent within a request message or a data packet to a particular service. When the service attempts to process the message or data packet containing the invalid value, the service may behave erratically or erroneously, possibly because it has not been programmed to handle the exception that is posed by the invalid value. The improper behavior of the service causes some form of problem within the operating system or the system in general, possibly forcing the operating system into some form of exception processing. In some cases, the vulnerability exploits a buffer overflow technique in which a service accepts a large amount of data that overflows the memory buffer into which the service is capturing the incoming data. The incoming data, however, is actually executable code for the receiving system, and the system is manipulated into executing the received executable code. In some cases, the system can be manipulated into recognizing the received executable code as the service's own executable code. Given the fact that the service often executes at a higher level of priority or with special privileges under the operating system because it is a system-level service, the received executable code can thereafter perform a wide range of operations with system-level privileges, which can have devastating consequences. From that point forward, a malicious user may copy confidential information, destroy data, reconfigure systems, hide so-called back-door programs, and perform a variety of other nefarious activities.

A particular vulnerability exists within a particular operating system and service. More specifically, since operating systems and services are continually improved through patches to fix vulnerabilities or updated to comprise new features, a particular vulnerability exists within a particular version of an operating system and/or a particular version of a service. Hence, a particular technique for exploiting a vulnerability is successful against a limited number of configurations of operating systems and services, possibly only a unique combination of a particular version of a service on a particular version of an operating system.

Given that a particular technique for exploiting a known vulnerability is successful only against certain system configurations, a malicious user usually attempts to probe a particular service. A service is typically probed by sending the service a set of messages or malformed data packets and then observing and analyzing the responses in an attempt to identify the particular version of an operating system, the particular version of a service at the probed system, or other information. In some cases, this information is explicitly provided in the response. In other cases, this information is gleaned from the values of parameters that are returned from the system by matching these values with values that are known to be returned by particular services or versions of services. In any case, the information that is returned in the responses from a particular system provides information about the configuration of that system, and given the fact that a particular configuration of an operating system and/or an associated service may have a vulnerability, the information that is returned in the responses from a particular system also provides information about the vulnerable characteristics of that system. A group of vulnerable characteristics of a system can be termed the system's "personality"; in other words, the manner in which the system exhibits certain behaviors in response to certain requests comprises the system's personality.

The process of matching content from the service responses with known values is termed "fingerprinting". These known values have also been compiled into databases, and various utilities exist for fingerprinting a system. These fingerprinting utilities can be used for legitimate purposes in order to identify the fact that a system is providing information about its vulnerable characteristics, or these fingerprinting utilities can be used for nefarious activities in order to gather information about systems that a malicious user desires to attack. Given that a malicious user usually desires to escape detection and prosecution for illegal activities, a malicious user typically probes a system prior to attacking it so that the malicious user can determine if the system has a vulnerability that can be exploited. Otherwise, the malicious user risks detection and prosecution for launching an attack that cannot succeed. After receiving information about particular vulnerable characteristics of a system, the malicious user can choose particular techniques for exploiting the vulnerable characteristics of the system through an attack on the system.

Rather than actively fingerprinting a system by sending it particular requests, a system can also be passively fingerprinted by observing or tracing responses to legitimate requests. In addition, fingerprinting can also work in the opposite manner through a process of reverse fingerprinting in which requests from a system are traced. By analyzing the values of parameters within the incoming request messages or data packets, it may be possible to identify configuration information about the requesting system. Moreover, since the manner in which a given, publicly available, fingerprinting utility operates is well-known, it is also possible to identify a fingerprinting utility through the manner in which it generates malformed requests or data packets during its fingerprinting operations.

With reference now to FIG. 3, a diagram depicts a set of modes of operation for a typical honeypot. A typical lifecycle for a honeypot can be categorized as a series of operational phases or a series of modes of operation. An administrative user configures a honeypot during a configuration phase (step 302), which may comprise a variety of steps that depend upon the particular honeypot that will be operated. After initialization, the honeypot begins operating within an emulation phase (step 304) during which one or more services are emulated while information about requests to those services are collected and logged. After a period of time, the honeypot is brought offline, and the logged information is then examined during an analysis phase (step 306). The analysis may include a determination that the system was probed during the emulation phase. In any case, an administrative user determines whether the configuration of the honeypot should be changed during a reconfiguration phase (step 308), e.g., in response to previous probes. After performing any required or desired reconfigurations, the honeypot is again brought online, and the cycle repeats as long as deemed necessary by the administrator.

With reference now to FIG. 4, a diagram depicts a set of modes of operation for the morphing honeypot of the present invention. In a manner similar to the process that is shown in FIG. 3, the morphing honeypot undergoes a configuration phase (step 402). In contrast to the process that is shown in FIG. 3, however, an morphing emulation phase with the present invention (step 404) continues while analysis operations (step 406) are automatically conducted along with automatic reconfiguration operations (step 408), as explained in more detail below.

Figure 5:
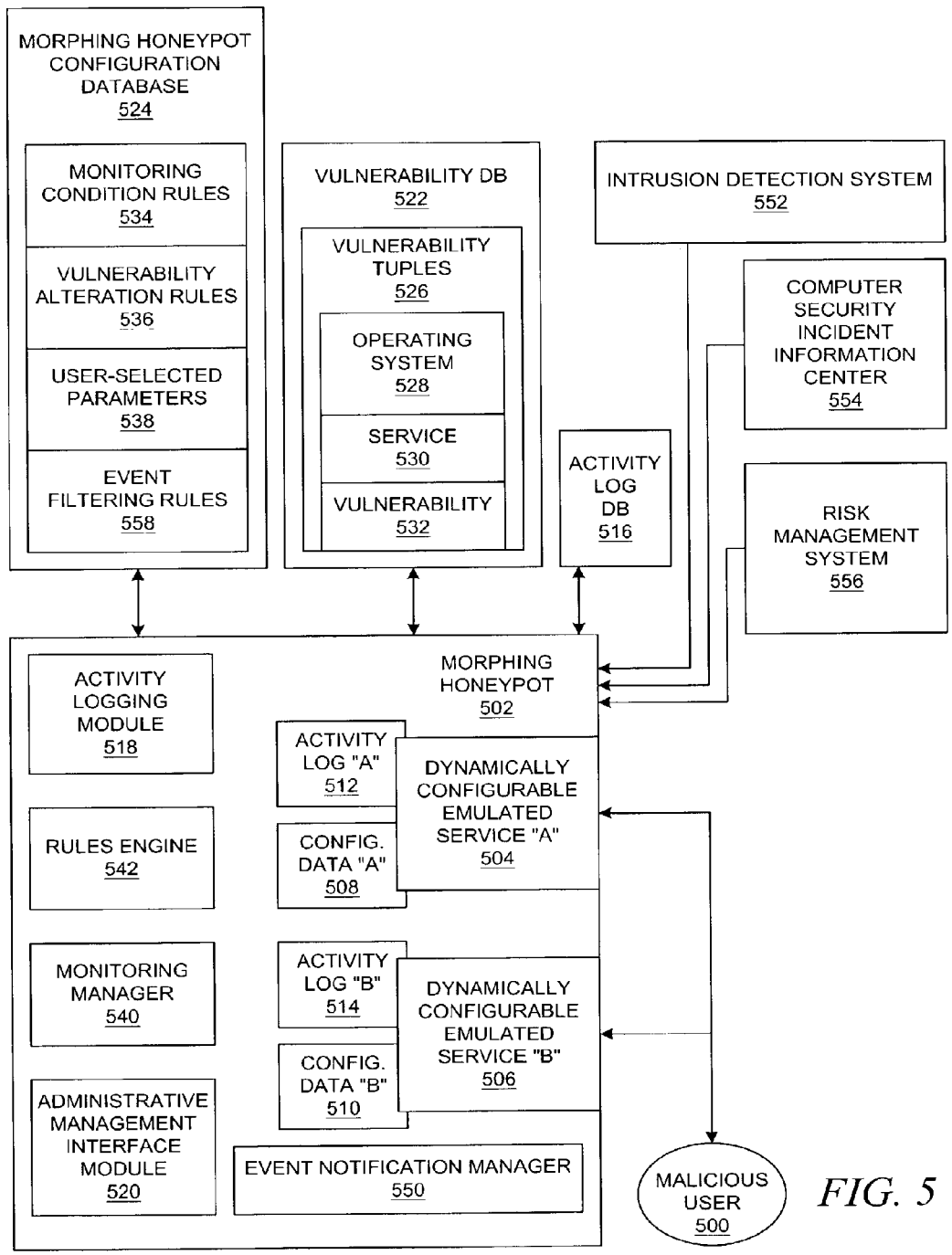
FIG. 5 depicts a block diagram of a set of components or modules that may be used within a morphing honeypot in accordance with an embodiment of the present invention.

With reference now to FIG. 5, a block diagram depicts a set of components or modules that may be used within a morphing honeypot in accordance with an embodiment of the present invention. Malicious user 500 acts to probe, to attack, or to compromise morphing honeypot 502, which emulates two different services in this example: dynamically configurable emulated service 504 and dynamically configurable emulated service 506. The set of services that are emulated by the morphing honeypot represent a type of facade on the underlying system. The facade may include virtual directories and files that are available for retrieval and/or manipulation by a malicious user. For each request that is received by an emulated service, the emulated service generates a response containing information about morphing honeypot 502. In a manner that would be expected for a production system, the emulated services of the morphing honeypot present information about vulnerable characteristics of the morphing honeypot as if it were a production system that is supporting a particular version of an operating system along with particular versions of the services that are executing on that operating system. In other words, the information that is returned by the emulated services in response to requests that are received by those emulated services allows malicious user 500 to fingerprint the emulated service. In response to fingerprinting an emulated service at morphing honeypot 502, the malicious user would determine one or more vulnerabilities that are typically possessed by other systems with similar fingerprints, after which malicious user 500 may launch attacks that are directed at those vulnerabilities.

Morphing honeypot 502 may or may not truly possess any of the indicated vulnerabilities, depending upon the operating system and associated set of services that are executing on morphing honeypot 502. However, the returned information should be interpreted by a malicious user as indicating a set of vulnerable characteristics at the morphing honeypot.

Each emulated service is configured through a set of parameters, such as configuration dataset 508 for emulated service 504 and configuration dataset 510 for emulated service 506; each set instructs the behavior of the associated emulated service. As each emulated service responds to requests, the activities of the service are logged, either locally into a local dataset, such as activity log dataset 512 for emulated service 504 and activity log dataset 514 for emulated service 506, or system-wide into activity log database 516 through activity logging module 518. An activity log or dataset may have information about the content of any requests that were received by any service supported by morphing honeypot 502, including emulated services 504 and 506, the time and conditions of the receipt of those requests, and information about the actions that were taken by the emulated services or the morphing honeypot as a whole, including the response that was returned for a given request. Other activity may be logged, such as any operations that are performed on behalf of an administrative user through administrative management interface module 520, which may be simply an interface to a management utility that controls morphing honeypot 502 or may comprise the functionality for acting as a management utility to control morphing honeypot 502.

Administrative management interface module 520 allows an administrative user to manage the operations of morphing honeypot 502 and the information that is stored within any databases that used by morphing honeypot 502, such as activity log database 516, vulnerability database 522, and morphing honeypot configuration database 524. Vulnerability database 522 may be created by morphing honeypot 502, or vulnerability database 522 may be obtained through other means; for example, as described above, vulnerability databases may be generated through other utilities or tools, or a vulnerability database may be obtained from a user group or possibly a security information center that disseminates information about computer security advisories, such as the CERT® Coordination Center (CERT/CC) operated by Carnegie Mellon University. A vulnerability database may have various forms of information; vulnerability database is organized to contain vulnerability tuples 526, each of which includes an indication of a version of an operating system 528, an indication of a version of computer service 530, and an indication of a known vulnerability 532 for the associated version of the operating system and the associated version of a computer service.

Morphing honeypot configuration database 524 contains monitoring condition rules 534, vulnerability alteration rules 536, and user-selected parameters 538, which are used in conjunction with the rules within the database or in some other manner by the morphing honeypot. Monitoring condition rules 534 and vulnerability alteration rules 536 may be manipulated, created, or deleted by an administrative user through administrative management interface module 520. Monitoring manager 540 uses rules engine 542 to evaluate the expressions within monitoring condition rules 534 to detect user-specified monitoring conditions within the emulated services. After a user-specified monitoring condition is detected, monitoring manager 540 uses rules engine 542 to evaluate the expressions within vulnerability alteration rules 536 to determine the next set of vulnerable characteristics that should be presented by the emulated services. Monitoring manager 540 obtains information from vulnerability database 522 for that set of vulnerable characteristics, i.e. the information that should be presented by an emulated service to indicate that morphing honeypot 502 possesses a particular vulnerability. The information is written into the appropriate configuration dataset for the appropriate emulated service; the emulated service then places the configurable information into the responses that it returns for the requests that it receives.

As noted above, a computer security vulnerability is discovered through a variety of means, and it may be assumed that information about a vulnerability is disseminated to malicious users as well as computer security administrators. However, malicious users often try to exploit a newly discovered vulnerability soon after learning about the newly discovered vulnerability.

The morphing honeypot of the present invention provides a computer system administrator with the ability to enhance the attractiveness of the honeypot to a malicious user by presenting information about a newly discovered vulnerability as a characteristic of the morphing honeypot; the intent is to attract a malicious user to the morphing honeypot with the expectation that a malicious user would hunt for a system that possesses the newly discovered vulnerability.

In addition, groups of malicious users disseminate information about the manner in which a computer vulnerability is exploited. Hence, many malicious users try to exploit a particular vulnerability on many different systems. Moreover, a particular malicious user may repeatedly try to exploit a particular vulnerability on many systems within a single network.

The morphing honeypot of the present invention provides a computer system administrator with the ability to enhance the attractiveness of the honeypot to a malicious user by presenting information about a newly discovered vulnerability as a characteristic of the morphing honeypot; the intent is to attract a malicious user to the morphing honeypot with the expectation that a malicious user would hunt for a system that possesses the newly discovered vulnerability soon after learning about the vulnerability.

As a possibly more utilized feature, the morphing honeypot of the present invention also provides a computer system administrator with the ability to enhance the attractiveness of the honeypot to a malicious user by presenting information about a particular vulnerability at the morphing honeypot after determining that the malicious user has attempted to exploit the same vulnerability at a different system. Again, the intent is to attract a malicious user to the morphing honeypot with the expectation that a malicious user would continue hunting for a system that possesses a particular vulnerability.

The morphing honeypot of the present invention provides the ability to enhance its attractiveness in these scenarios by integrating through various means to obtain, retrieve, or receive event notification messages that are generated external to the morphing honeypot. An event notification message provides information about a newly discovered vulnerability or a newly detected probe or attack; the morphing honeypot configures itself to exhibit characteristics of a newly discovered vulnerability or a newly detected probe or attack in an attempt to lure a malicious user into activity at the morphing honeypot.

Morphing honeypot 502 includes event notification manager 550 that performs some operations that are similar to monitoring manager 540. Event notification manager 550 integrates morphing honeypot 502 with various configurable event detection systems that are able to send event notification messages to morphing honeypot 502. An event notification message informs event notification manager 550 of a particular type of event; the format and content of the event notification message may be dependent upon the type of event detection system. Actions by event notification manager 550 and the receipt of event notification messages may also be logged into activity database 516; the number and type of event notification messages over time may result in a change in the displayed personality of the morphing honeypot. Although some examples of various sources of event notification messages are shown in FIG. 5, the morphing honeypot may be integrated with a wide variety of external systems that either direct the operation of the morphing honeypot or assist in the operation of the morphing honeypot.

Event notification manager 550 interprets an event notification message, which may be encrypted and digitally signed to protect its data integrity. Event notification manager 550 has an ability to parse messages and to filter messages. In one embodiment, morphing honeypot 502 may be tightly integrated with the source of an event notification message; in response to receipt of a particular event notification message, morphing honeypot 502 may alter its personality in response to the receipt of information within an event notification message. In other words, the source system that generates the event notification message sends information that monitoring manager 540 uses directly to control an emulated service. In this scenario, the source system has already determined a condition that requires a change in the personality of the morphing honeypot and has also possibly determined a new vulnerability that the morphing honeypot should present within an emulated service. Event notification manager 550 uses information within the event notification message as information that should be placed within the configuration dataset of an emulated service.

In an alternative embodiment, event notification manager 550 uses information within the event notification message like a satisfied monitoring condition within monitoring manager 540, i.e. as if the source system has already determined a condition that requires a change in the personality of the morphing honeypot. In this scenario, however, event notification manager 550 uses vulnerability alteration rules 536 to determine a new vulnerability that the morphing honeypot should present within an emulated service.

In another embodiment, event notification manager 550 uses information within the event notification message as input to monitoring manager 540, which then uses the event as merely one parameter while evaluating an expression within a monitoring condition rule. In this case, notification of an-event is merely part of a condition that requires a change in the personality of the morphing honeypot. In this scenario, monitoring manager 540 uses vulnerability alteration rules 536 to determine a new vulnerability that the morphing honeypot should present within an emulated service when a monitoring condition rule is satisfied.

In yet another embodiment, event notification manager 550 uses information within the event notification message as parameters for evaluating expressions within event filtering rules 558, which are similar to monitoring condition rules but may be applicable primarily to detected events. Since detected events may be numerous, it may not be desirable to change the personality of a morphing honeypot for each detected event, and it may be desirable to change the personality of the morphing honeypot only upon detection of a particular combination of events. Event filtering rules 558 provide expressions for determining when to change the personality of a morphing honeypot in response to event notification messages.

Intrusion detection system 552 detects possible intrusions within a network, a system, or an application. For example, intrusion detection system 552 may represent an anti-virus application that monitors a system for infiltration by viruses. As another example, intrusion detection system 552 may be an instance of the Cisco® Secure Intrusion Detection System, which includes network sniffers for detecting unauthorized activity from data derived directly from a network; the Cisco® Secure Intrusion Detection System is configurable to send different types of alarm/event messages to different destinations.

Computer security incident information center 554 provides advisories and incident notes about widespread computer security problems, such as the CERT® Coordination Center (CERT/CC) that was mentioned above. Various computer security incident information centers exist for particular industries or organizations. For example, the Financial Services Information Sharing and Analysis Center (FS-ISAC) provides an industry-wide database of electronic security threats, vulnerabilities, incidents, and solutions for financial institutions. The Federal Computer Incident Response Center (FedCIRC) is the central coordination and analysis facility dealing with computer-security-related issues affecting the civilian agencies and departments of the federal government.

Event notification messages concerning identified threats and vulnerabilities may be retrieved from a database that is maintained by a computer security incident information center, e.g., the CERT Knowledgebase. Alternatively, event notification messages may be broadcast from a computer security incident information center to interested parties; morphing honeypot 502 may be required to register with the computer security incident information center in order to receive the event notification messages, e.g., the CERT advisory mailing list. In parallel with activities to change the personality of the morphing honeypot through its emulated services, event notification manager 550 may update morphing honeypot configuration database 524 or vulnerability database 522 in response to information from computer security incident information center 554.

Risk management system 556 represents another potential source of event notification messages. Risk management system 556 has the ability to correlate, evaluate, and escalate alarms/events from many different types of computer security sensors, e.g., network intrusion detection systems, anti-virus sensors, firewalls, or other sensors. An example of a risk management system is the IBM Tivoli Risk Manager, which correlates and prioritizes a vast number of security events that are generated across applications, operating systems, and network devices to provide an overall view of an enterprise's security architecture.

Figure 6:
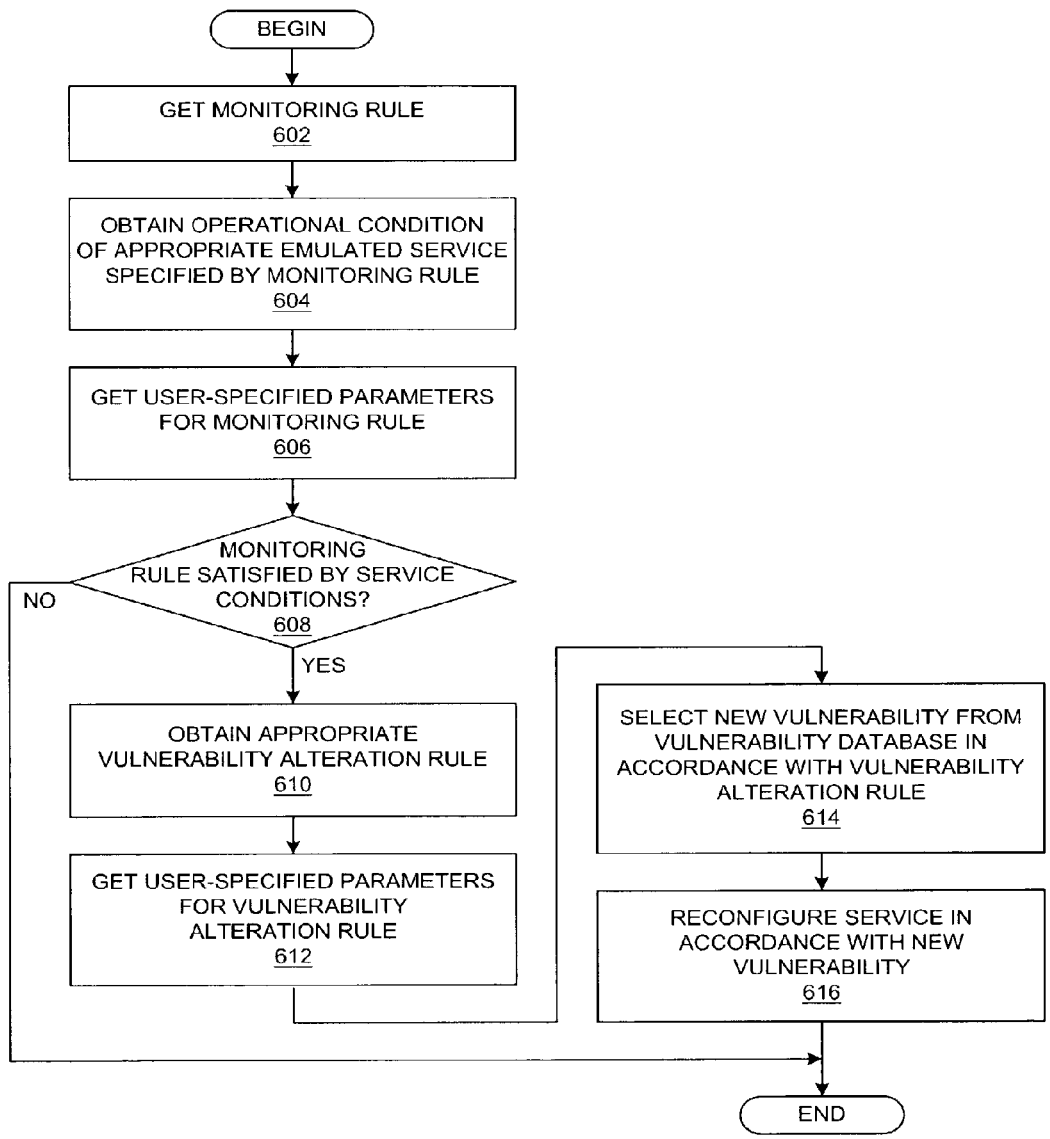
FIG. 6 depicts a flowchart for dynamically determining when to alter the information that indicates that the honeypot has vulnerable characteristics in accordance with monitored conditions.

With reference now to FIG. 6, a flowchart depicts a process for dynamically determining when to alter the information that indicates that the honeypot has vulnerable characteristics in accordance with monitored conditions. The process begins by obtaining a monitoring rule, e.g., from a monitoring rule database or some other database associated with the morphing honeypot (step 602). The retrieved monitoring rule may be applicable to one or more emulated services, but assuming that the retrieved monitoring rule is applicable to one particular type of emulated service, then the operational condition of the appropriate emulated service, as indicated in the monitoring rule, is retrieved (step 604). The operational condition may include an activity log for the emulated service, but the operational condition may also include information that is maintained by the emulated service or by a monitoring manager that communicates with the emulated service. For example, the operational condition may include a timestamp for the most recent reconfiguration of the emulated service or for other operations that are internal to the morphing honeypot; in contrast, the activity log may indicate only actions that have occurred with respect to entities external to the morphing honeypot.

Any user-specified parameters that may be applicable to the retrieved monitoring rule are also retrieved (step 606). The monitoring rule may be configured as an expression with variables, and the user-specified parameters may be used as input into the expression prior to evaluating the expression. In this manner, a set of monitoring rules may be stored like a template, and the user-specified parameters configure the monitoring rules for a particular honeypot.

A determination is then made as to whether the operational condition of the emulated service satisfies the retrieved monitoring rule as evaluated (step 608). If not, then the process is complete.

It may be assumed that the process that is shown in FIG. 6 is only a portion of a larger process. For example, a set of monitoring rules from a monitoring rule database may be loaded during the initialization of the morphing honeypot. Thereafter, the monitoring rules are updated within the database, and the morphing honeypot may dynamically update its copy of the monitoring rules as necessary. For example, an administrative user may be allowed to dynamically add or delete monitoring rules through an appropriate interface.

In addition, the morphing honeypot may continually cycle through all of the monitoring rules, thereby performing the process that is shown in FIG. 6 for all of the monitoring rules. Moreover, rather than inserting and deleting monitoring rules from the database when the monitoring rules are active, the morphing honeypot may provide an interface for setting or resetting activation flags that are associated with the monitoring rules and that indicate whether a particular monitoring rule is active or inactive.

If the operational condition of the emulated service satisfies the retrieved monitoring rule at step 608, then an appropriate vulnerability alteration rule is retrieved (step 610). A vulnerability alteration rule directs the morphing activities of the morphing honeypot such that the morphing honeypot moves from presenting one personality to another personality. More specifically, a vulnerability alteration rule guides the selection of the next set of vulnerability information that should be presented by an emulated service. Whenever an operational condition of an emulated service is detected, as indicated by a monitoring rule, then the emulated service changes its personality in accordance with a vulnerability alteration rule.

Alternatively, rather than using a single vulnerability alteration rule, a plurality of vulnerability alteration rules may be associated with the previously retrieved monitoring rule; in other words, the previously retrieved monitoring rule also indicates a set of rules that should be used when the monitoring rule is satisfied. If a set of vulnerability alteration rules are indicated, then the set of vulnerability alteration rules may be evaluated in accordance with user-specified parameters and/or other information to select the vulnerability alteration rule that has a highest relevancy value, i.e. each vulnerability alteration rule may also have an expression that evaluates to indicate the appropriateness of choosing that particular vulnerability alteration rule.

In a manner similar to the monitoring rules, each vulnerability alteration rule may be configured as an expression with variables, and the user-specified parameters may be used as input into the expression prior to evaluating the expression. In this manner, there may be an expression to select a vulnerability alteration rule along with an expression that indicates the next vulnerability that should be used by the emulated service.

The user-specified parameters that are applicable to the selected vulnerability alteration rule are retrieved (step 612), and the next vulnerability is selected from the vulnerability database in accordance with the selected vulnerability alteration rule (step 614). The emulated service is then reconfigured in accordance with the new vulnerability (step 616), and the process is complete with respect to a particular monitoring rule.

Figure 7:
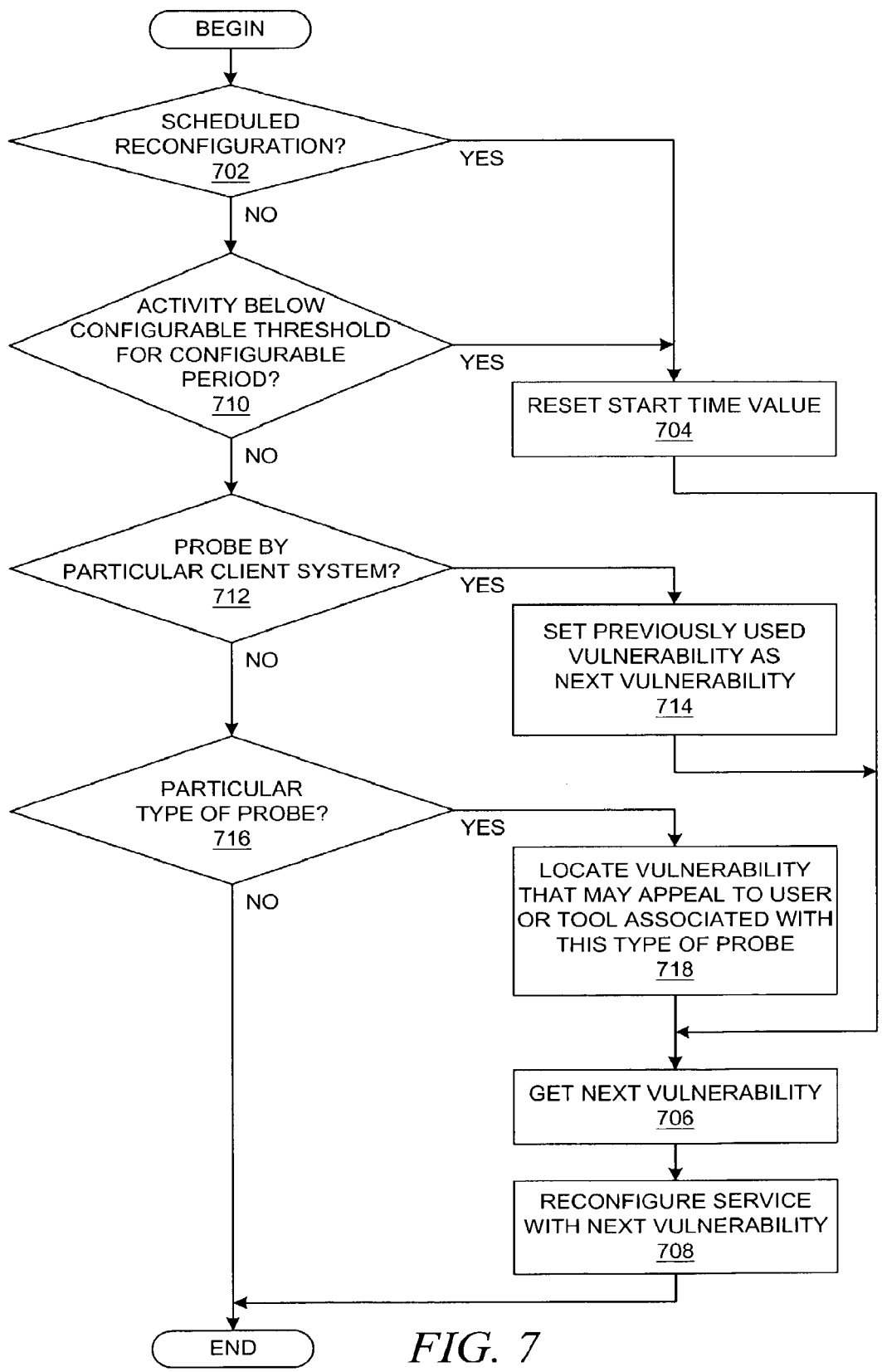
FIG. 7 depicts a flowchart that shows some of the monitored conditions that might be considered by a morphing honeypot.

With reference now to FIG. 7, a flowchart depicts some of the monitored conditions that might be considered by a morphing honeypot. The process that is shown in FIG. 6 performs an evaluation of a monitoring rule followed by the evaluation of a vulnerability alteration rule. FIG. 7 is similar to FIG. 6 in that FIG. 7 provides examples of morphing conditions; the description of the processing of these conditions combines aspects of evaluating monitoring conditions along with aspects of selecting a new vulnerability to be presented by the morphing honeypot.

The process begins with a determination of whether or not a point in time has been reached when a scheduled reconfiguration should be triggered (step 702). For example, an administrative user may select many options within an administrative management utility for the morphing honeypot. Some of these options may provide the ability to select various temporal parameters for the morphing conditions; examples of temporal parameters may include: a repeatable cycle for changing the personality of the morphing honeypot; particular dates and times when the morphing honeypot will alter its behavior; a schedule of multiple dates and times for presenting new vulnerabilities; or some other time-related value. The condition may be triggered by the expiration of a previously created software timer. If a scheduling condition for a monitoring rule is matched, then an associated timer is reset if necessary (step 704), and a next vulnerability is obtained (step 706). The scheduling condition may have a vulnerability alteration rule that iterates through a set of selected or predetermined vulnerabilities. The appropriate service is then reconfigured to present information reflecting a different vulnerability (step 708), and the process is complete.

If a scheduled reconfiguration has not been triggered at step 702, then a determination is made as to whether a condition has been triggered in which the morphing honeypot determines that logged activity by the morphing honeypot is below a previously configured threshold value for a previously configured amount of time (step 710). In this scenario, the amount of logged activity is relied upon by an administrative user as an indicator of the attractiveness of the morphing honeypot to malicious users. In addition, it is assumed that the morphing honeypot can experience more probes, more attempted attacks, or more actual attacks if the vulnerable characteristics of the honeypot are changed to match the vulnerabilities that are sought by a malicious user. The condition may be triggered by the expiration of a previously created software timer, at which time the morphing honeypot reviews the activities of all emulated services, a subset of emulated services, or a single emulated service. Various heuristics may be employed to determine whether or not the level of activity is insufficient, thereby triggering the reconfiguration operation; these heuristics may also be stored in the form of expressions, wherein activity-related parameters from one or more activity logs are used to evaluate the expression. If the condition is matched, then a timer value may be reset if necessary at step 704, and a next vulnerability is obtained at step 706. The appropriate service is then reconfigured to present information reflecting a different vulnerability at step 708, and the process is complete.

If an inactivity threshold is not violated at step 710, then a determination is made as to whether or not a probe has been detected from a particular client system (step 712). In this scenario, the morphing honeypot may track suspicious requests over time from a particular client system. For example, a client system may be identified by an IP address, and an emulated service can be configured to scan for the particular IP address. If a subsequent request is received from the previously identified IP address, then the emulated service can notify the monitoring engine within the morphing honeypot, which then determines whether a monitoring rule is triggered by the receipt of a request from the particular client system. After this particular monitoring rule is triggered, the morphing honeypot may attempt to present the same vulnerability that was previously presented to the client system in an effort to entice a malicious user into thinking that the emulated service has not changed its behavior since a previous probe. In the process shown in FIG. 7, the morphing honeypot sets the next vulnerability to the vulnerability that was previously presented to this particular client system (step 714), which may have been stored within the activity log database when the previous probe was logged. Thereafter, the morphing honeypot gets the next vulnerability at step 706, and the appropriate service is then reconfigured to present information reflecting a different vulnerability at step 708, and the process is complete.

Alternatively, rather than attempting to present the same vulnerability that was previously presented to the client system, the morphing honeypot may present vulnerability information to the client system in an effort to entice a malicious user into thinking that the emulated service has specifically changed its behavior in response to a previous probe or attack.

For example, a malicious user might attempt to attack a typical production system from a particular client system based on a discovered vulnerability in the production system. In response, an administrative user might install a particular operating system patch that is known to fix the vulnerability. However, the newly installed operating system patch may have a different vulnerability that could be exploited by the malicious user, and the malicious user might expect to participate in a series of actions and counteractions in which a production system is updated in response to probes or attacks by the malicious user.

The morphing honeypot may be configured to play to the expectations of the malicious user; the morphing honeypot can lure the malicious user into thinking that a previously presented vulnerability was specifically fixed in response to activities by the malicious user. The morphing honeypot can be configured such that a series of vulnerability alteration rules can follow a particular chain of known vulnerabilities and fixes. In this manner, the morphing honeypot appears to the malicious user to be a constantly upgraded system, thereby luring the malicious user into activities at the morphing honeypot while concealing the true nature of the honeypot.

If a probe by a particular client system is not detected at step 714, then a determination is made as to whether or not a particular type of probe is detected (step 716). If not, the process is complete, after which the morphing honeypot may perform other duties, such as storing activity logs, and the process of evaluating monitoring rules would be started again at some later point in time. In addition, the morphing honeypot may be multithreaded such that various monitoring conditions are constantly evaluated through dedicated threads.

A particular type of probe may be detected at step 716 through the use of reverse fingerprinting, as mentioned above. By analyzing one or more requests or one or more data packets, the morphing honeypot may determine that a client system is probing for a particular form of vulnerability, particularly in a scenario in which the morphing honeypot is not implemented on a production system and should not be receiving any legitimate data traffic.

If a particular type of probe is detected, then the morphing honeypot searches for and locates a next vulnerability that may appeal to a malicious user or tool that is associated with the detected type of probe (step 718). Thereafter, the morphing honeypot gets the next vulnerability at step 706, and the appropriate service is then reconfigured to present information reflecting a different vulnerability at step 708, and the process is complete.

Figure 8:
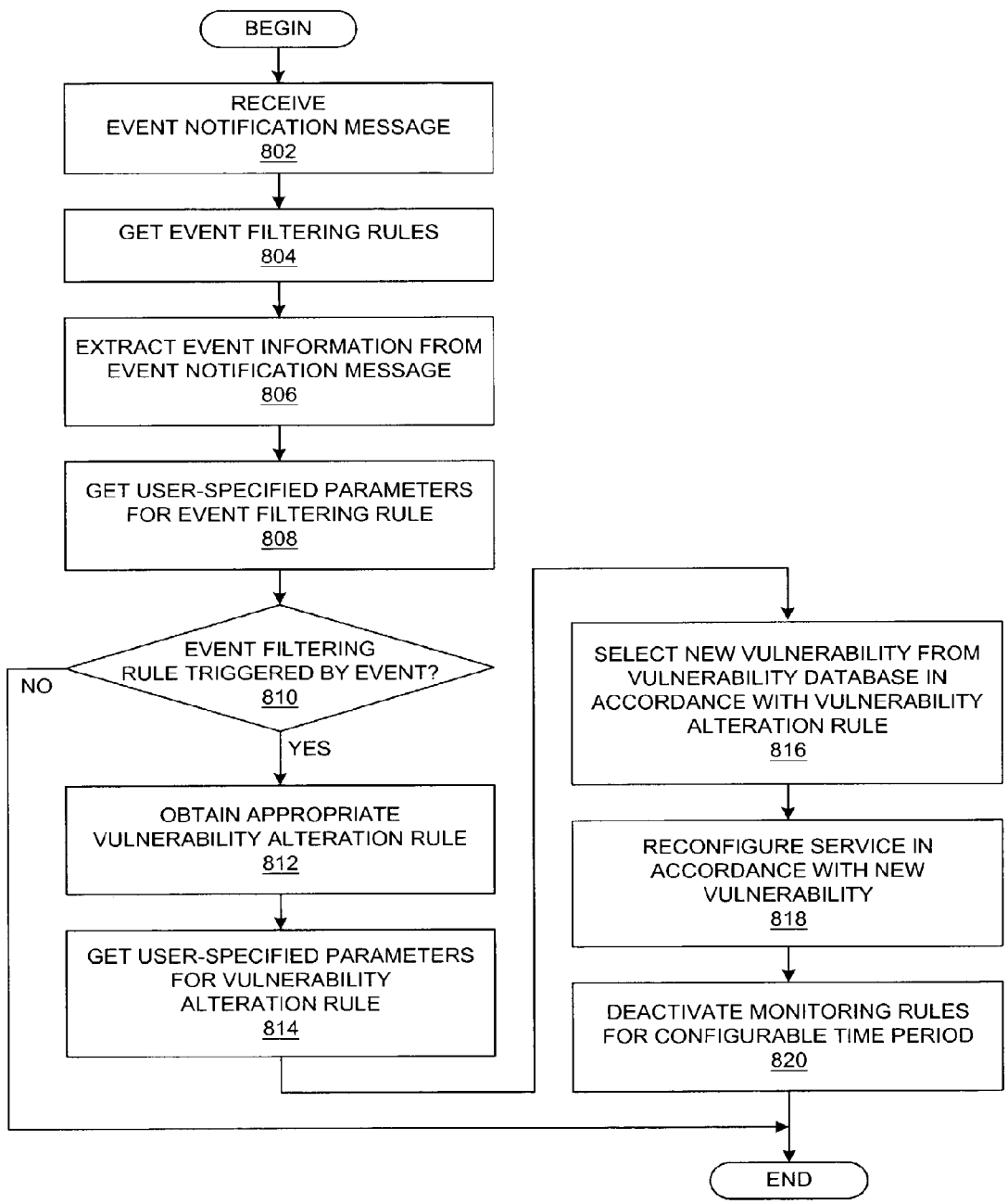
FIG. 8 depicts a flowchart that shows a process for dynamically determining when to alter the information that indicates that the honeypot has vulnerable characteristics in accordance with event notifications.

With reference now to FIG. 8, a flowchart depicts a process for dynamically determining when to alter the information that indicates that the honeypot has vulnerable characteristics in accordance with event notifications. The process begins when an event notification message is received (step 802), e.g., from an intrusion detection system. The morphing honeypot obtains a set of event filtering rules (step 804), e.g., from a morphing honeypot configuration database or some other database associated with the morphing honeypot. The event information is then extracted from the event notification message (step 806). As noted above, the event notification message may be received from a variety of sources for a variety of purposes; hence, the event information may include various types of information, e.g., an indication of a type of operating system and a type of service.

Any user-specified parameters that may be applicable to the retrieved event filtering rules are also retrieved (step 808). Each event filtering rule may be configured as an expression with variables, and the user-specified parameters may be used as input into the expression prior to evaluating the expression. In this manner, a set of event filtering rules may be stored like a template, and the user-specified parameters configure the event filtering rules for a particular honeypot as desired by an administrative user.

A determination is then made as to whether any of the retrieved event filtering rules are triggered by the event notification (step 810). If not, then the process is complete.

It may be assumed that the process that is shown in FIG. 8 is only a portion of a larger process. For example, a set of event filtering rules from an event filtering rule database may be loaded during the initialization of the morphing honeypot. Thereafter, the event filtering rules are updated within the database, and the morphing honeypot may dynamically update its copy of the event filtering rules as necessary. For example, an administrative user may be allowed to dynamically add or delete event filtering rules through an appropriate interface.

If the received event notification satisfies a retrieved event filtering rule at step 810, then an appropriate vulnerability alteration rule is retrieved (step 812). Whenever an event filtering rule is triggered by an event notification, as indicated by an event filtering rule, then the emulated service changes its personality in accordance with a vulnerability alteration rule. In a manner similar to that described above for monitoring rules, a plurality of vulnerability alteration rules may be associated with the previously retrieved event filtering rule.

Any user-specified parameters that are applicable to a selected vulnerability alteration rule are retrieved (step 814), and the next vulnerability is selected from the vulnerability database in accordance with the selected vulnerability alteration rule (step 816). The emulated service is then reconfigured in accordance with the new vulnerability (step 818).

Although it may be desirable to have the morphing honeypot change personalities in response to monitored conditions and events, it may also be desirable to prevent the personality of the morphing honeypot from changing too frequently. Since an event notification message is received from a system or an application that is external to the morphing honeypot, the morphing honeypot may be configured so that the event filtering rules take precedence over any active monitoring rules. In this example, any active monitoring rules are deactivated for a configurable time period after the personality of the morphing honeypot is changed in response to an event notification (step 820), and the process is complete.

The advantages of the present invention should be apparent in view of the detailed description that is provided above. The morphing honeypot of the present invention increases the likelihood that a malicious user will identify the honeypot as a vulnerable system that seems ripe for nefarious activity. The overall security of a distributed data processing system or network is increased if a computer administrator is able to keep a malicious user interested in the honeypot system while providing time to determine appropriate responses to the actions of the malicious user. Moreover, if an outright attack is made on the honeypot by a malicious user, an administrator may be able keep the attack shunted to particular systems within an enterprise, thereby limiting any damage that might be caused or any information that might be compromised. By integrating the actions of the morphing honeypot with the events that are detected by an intrusion detection system, an administrator is provided with another tool for limiting the damage that might be caused by a computer security incident. The morphing honeypot can change its characteristics to entice a malicious user to something that the malicious user might consider as more vulnerable, exploitable, and, therefore, more intriguing.

It is important to note that while the present invention has been described in the context of a fully functioning data processing system, those of ordinary skill in the art will appreciate that the processes associated with the present invention are capable of being distributed in the form of instructions in a computer readable medium and a variety of other forms. Examples of computer readable media include media such as EPROM, ROM, tape, paper, floppy disc, hard disk drive, RAM, and CD-ROMs.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A data processing system comprising:
   a processor;
   a computer memory holding computer program instructions which when executed by the processor perform a method comprising:
   emulating a service on a server;
   sending a response that comprises information indicating a set of vulnerable characteristics at the server in response to receiving a request at the emulated service;
   obtaining, from a source external to the server, an event notification message concerning an event external to the server, wherein the source is one of: a network intrusion detection system, an operating system-based intrusion detection system, an application-based intrusion detection system, and a risk management system; and
   responsive to obtaining the event notification message and being operative as the service is emulated on the server, automatically reconfiguring the set of vulnerable characteristics according to a vulnerability alteration rule when an operational condition associated with the emulated service, as specified in a rule, is detected.

2. The data processing system of claim 1 wherein the method further comprises:
   configuring a database of vulnerable characteristics.

3. The data processing system of claim 2 wherein the method further comprises:
   selecting the set of vulnerable characteristics from the database of vulnerable characteristics in accordance with a type of operating system, a type of emulable service, or a type of vulnerable characteristic.

4. The data processing system of claim 3 wherein the method further comprises:
   extracting one or more notification values from the event notification message, each notification value indicating an operating system associated with the event, a type of service associated with the event, a type of vulnerable characteristic associated with the event, or some other characteristic associated with the event; and
   deriving the set of vulnerable characteristics from the database of vulnerable characteristics in accordance the one or more extracted values.

5. The data processing system of claim 1 wherein the method further comprises:
   configuring a database of filtering rules;
   retrieving the filtering rule from the database of filtering rules;
   examining the event notification message in accordance with the filtering rule; and
   triggering the automatic reconfiguration of the set of vulnerable characteristics in response to a determination that the event notification message passes the filtering rule.

6. The data processing system of claim 5 wherein the method further comprises:
   retrieving the vulnerability alteration rule that is associated with the filtering rule; and
   deriving the reconfigured set of vulnerable characteristics from a database of vulnerable characteristics.

7. The data processing system of claim 6 wherein the method further comprises:
   specifying a parameter for a type of operating system in the vulnerability alteration rule to be used in deriving the reconfigured set of vulnerable characteristics.

8. The data processing system of claim 6 wherein the method further comprises:
specifying a parameter for a type of service in the vulnerability alteration rule to be used in deriving the reconfigured set of vulnerable characteristics.

9. The data processing system of claim 1 wherein the method further comprises:
logging the event notification message; and
temporally varying the set of vulnerable characteristics based on information in multiple logged event notification messages over a configurable period of time.

10. The data processing system of claim 1 wherein the method further comprises:
subscribing to receive event notification messages with an event sensor external to the server.

11. The data processing system of claim 1 wherein the method further comprises:
retrieving an event notification message from a computer security incident information center.

12. A computer readable medium containing a computer program product for use in a data processing system, the computer program product holding computer program instructions which when executed by the data processing system perform a method comprising: emulating a service on a server; sending a response that comprises information indicating a set of vulnerable characteristics at the server in response to receiving a request at the emulated service; obtaining, from a source external to the server, an event notification message concerning an event external to the server, wherein the source is one of: a network intrusion detection system, an operating system-based intrusion detection system, an application-based intrusion detection system, and a risk management system; and responsive to obtaining the event notification message and being operative as the service is emulated on the server, automatically reconfiguring the set of vulnerable characteristics according to a vulnerability alteration rule when an operational condition associated with the emulated service, as specified in a rule, is detected.

13. The computer readable medium of claim 12 wherein the method further comprises: configuring a database of vulnerable characteristics.

14. The computer readable medium of claim 13 wherein the method further comprises: selecting the set of vulnerable characteristics from the database of vulnerable characteristics in accordance with a type of operating system, a type of emulable service, or a type of vulnerable characteristic.

15. The computer readable medium of claim 14 wherein the method further comprises: extracting one or more notification values from the event notification message, each notification value indicating an operating system associated with the event, a type of service associated with the event, a type of vulnerable characteristic associated with the event, or some other characteristic associated with the event; and deriving the set of vulnerable characteristics from the database of vulnerable characteristics in accordance the one or more extracted values.

16. The computer readable medium of claim 12 wherein the method further comprises: configuring a database of filtering rules; retrieving the filtering rule from the database of filtering rules; examining the event notification message in accordance with the filtering rule; and triggering the automatic reconfiguration of the set of vulnerable characteristics in response to a determination that the event notification message passes the filtering rule.

17. The computer readable medium of claim 16 wherein the method further comprises: retrieving the vulnerability alteration rule that is associated with the filtering rule; and deriving the reconfigured set of vulnerable characteristics from a database of vulnerable characteristics.

18. The computer readable medium of claim 17 wherein the method further comprises: specifying a parameter for a type of operating system in the vulnerability alteration rule to be used in deriving the reconfigured set of vulnerable characteristics.

19. The computer readable medium of claim 17 wherein the method further comprises: specifying a parameter for a type of service in the vulnerability alteration rule to be used in deriving the reconfigured set of vulnerable characteristics.

20. The computer readable medium of claim 12 wherein the method further comprises: logging the event notification message; and temporally varying the set of vulnerable characteristics based on information in multiple logged event notification messages over a configurable period of time.

21. The computer readable medium of claim 12 wherein the method further comprises: subscribing to receive event notification messages with an event sensor external to the server.

22. The computer readable medium of claim 12 wherein the method further comprises: retrieving an event notification message from a computer security incident information center.

* * * * *